UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PLASTIC COMPOSITION.

1,259,806.  Specification of Letters Patent.  Patented Mar. 19, 1918.

No Drawing.   Application filed September 23, 1915.   Serial No. 52,316.

*To all whom it may concern:*

Be it known that I, FRANK J. TONE, a citizen of the United States, residing at Niagara Falls, in the county of Niagara and State of New York, have invented a new and useful Improvement in Plastic Composition, of which the following is a full, clear, and exact description.

This invention relates to the manufacture of articles of plastic or organic plastic materials, such as rubber, shellac, bakelite and celluloid; and particularly refers to a plastic composition containing as a filler finely divided silicious material. In describing the invention, I will refer to rubber as the main plastic material, with the understanding that the invention is equally applicable in connection with other organic plastic materials.

As is well known in this art it is customary in many classes of soft and hard rubber to incorporate with rubber foreign material, such as litharge, whiting, blanc-fixe, zinc oxids, etc., to give certain properties to manufactured rubber. Among the essential properties of such materials may be stated insolubility in water, fine subdivision, and chemical inertness toward rubber and materials with which the finished rubber article may come in contact while in actual use.

In my United States Patent No. 993,913, for silicon-oxygen product, patented May 30, 1911, I described the product silicon-monoxid and the process for making same. This is a substance which is chemically inert in the presence of most materials, is not affected by heat except at high temperatures, and is one of the most finely subdivided substances known. These properties adapt it very satisfactorily as a filling material in the manufacture of rubber. Its method of use may follow that employed in the manufacture of rubber using any of the well known fillers. As a typical example, I have taken ninety-one parts of raw Pará rubber, twenty-nine parts of silicon monoxid, and ten parts of sulfur. The rubber is first washed and then by the process of rolling well known in the art, the powdered monoxid and the sulfur are thoroughly incorporated with the rubber in sheet form. It is then formed or molded into the shape desired and is heated in steam-heated molds to a vulcanizing temperature. The resulting material shows satisfactory qualities as regards elasticity, mechanical strength, resistance to wear, resistance to pressure, and chemical inertness.

In the process of manufacturing silicon monoxid, as commercially carried on, there is present in the final product a varying proportion of sublimed silica due to the oxidation of some monoxid and also to the vaporization and subsequent condensation of silica. This substance is of substantially equal value as a filler, inasmuch as it possesses most of the valuable properties of silicon monoxid. By electrically heating a charge of pure silica and allowing the vaporized silica to condense or sublime a finely divided silica is formed, which is also found to be very suitable for the purpose herein described. Likewise, a silicious charge consisting principally of silica, together with certain impurities, such as the oxids of aluminum, calcium, titanium, iron, manganese, etc., with or without reducing agent, when electrically heated to a temperature causing the vaporization of the charge and subsequently condensed or sublimed, gives a sublimed silicious product which is very finely divided and of value for the purpose herein described. I, therefore, do not limit myself to silicon monoxid, but mean to include all sublimed silicous products in which a finely divided condensation product is obtained by vaporizing and subsequently cooling silicious products with or without partial reduction of the same.

Silicon monoxid has a specific gravity of 2.20. The specific gravity of some of the other well known fillers is as follows:

| | |
|---|---|
| Whiting | 2.7 to 2.9 |
| Barium sulfate | 4.3 to 4.6 |
| Litharge | 9.3 |
| White lead | 6.1 to 6.2 |
| Zinc oxid | 5.6 |

The low specific gravity of monoxid and other silicious materials is of advantage in many classes of articles.

In incorporating silicon monoxid or other sublimed silicious material as a filler with organic plastics other than rubber, similar methods are employed to those used in the incorporation of other fillers with these substances, such methods being well known to those skilled in the respective arts. For example, in the manufacture of emery wheels, using shellac as a binding material and silicon monoxid as a hardening and toughening agent for the bond, the shellac is ground to a fine powder, mixed with the emery grain and silicon monoxid, all in a dry state, and then melted at a temperature of about 450 degrees F. It is then cooled and again crushed to granular form. It is then placed in molds corresponding to the shape of the wheels desired, then melted, and subjected to a pressure of about two thousand pounds per square inch. The article is then taken out of the mold and baked for twenty-four hours or longer at a temperature of about 350 degrees.

Silicon monoxid may likewise be incorporated with shellac by dissolving the shellac in alcohol and mixing the powdered monoxid therewith.

In all cases, the silicious material should be mixed in the early process of manufacture and as thoroughly and uniformly as possible.

I claim:

1. As a new composition of matter, a plastic composition containing a filler of sublimed material containing silicon.

2. As a new composition of matter, a plastic composition containing a filler of sublimed material containing an oxid of silicon.

3. As a new composition of matter, a plastic composition containing a filler of silicon monoxid.

4. As a new composition of matter, an organic plastic material combined with a filler of a sublimed material containing silicon.

5. As a new composition of matter, an organic plastic material combined with a filler of a sublimed material containing an oxid of silicon.

6. As a new composition of matter, an organic plastic material combined with a filler of silicon monoxid.

7. A new composition of matter containing rubber and a filler of a sublimed material containing silicon.

8. A new composition of matter containing rubber and a filler of a sublimed material containing an oxid of silicon.

9. A new composition of matter containing rubber and silicon monoxid.

10. A new composition of matter containing rubber and a sublimed product consisting principally of an oxid of silicon and having minor proportions of other mineral matter.

In testimony whereof, I have hereunto set my hand.

FRANK J. TONE.

Witnesses:
 THEODORA PUFFER,
 MAX MAMAN.